Figure 8:
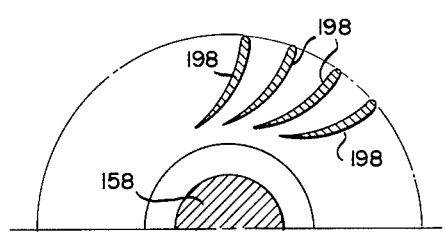
Figure 9:
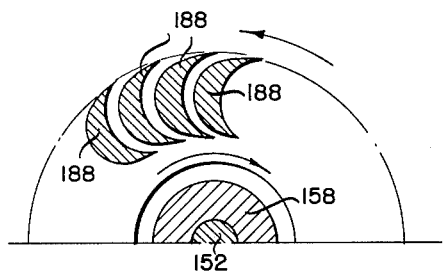

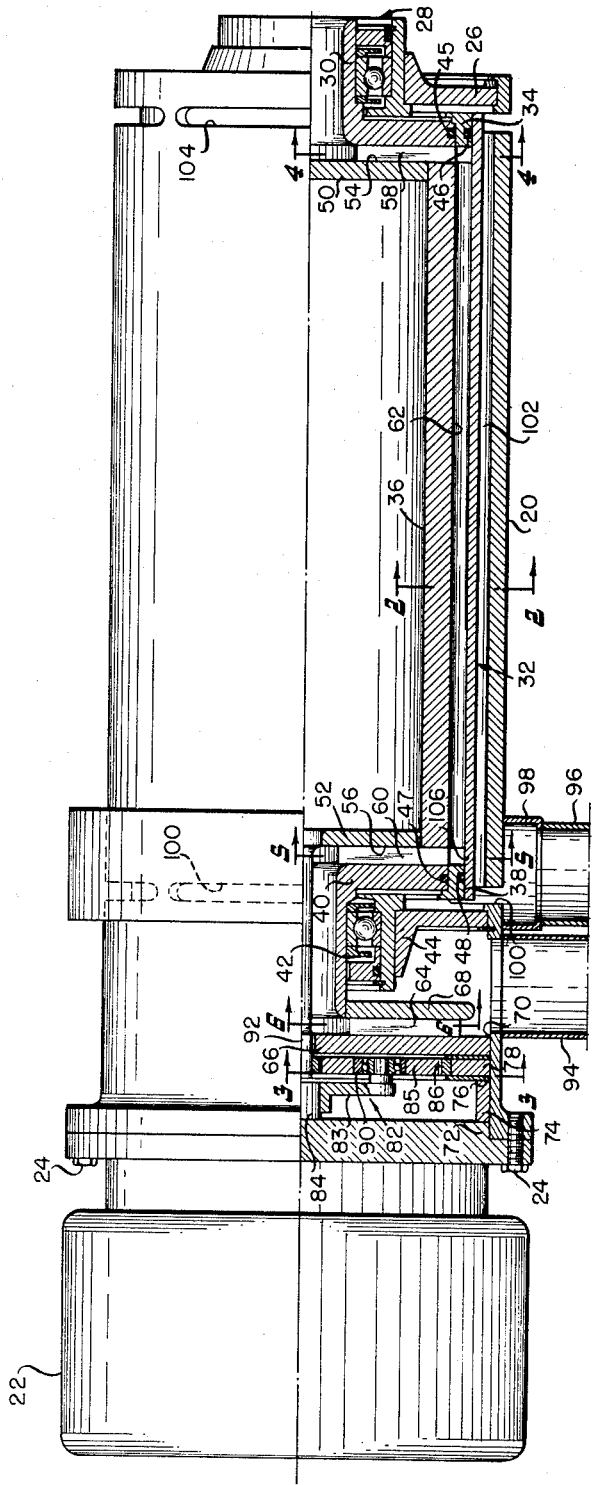

July 21, 1964 BO N. HOFFSTROM 3,141,310
HEAT PUMPS
Filed Oct. 16, 1962 4 Sheets-Sheet 2
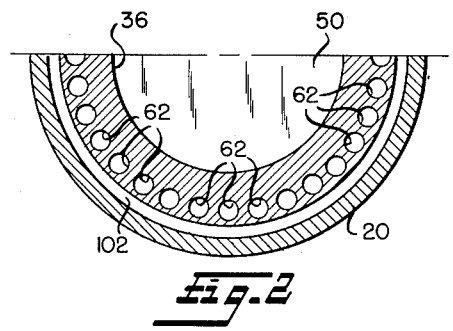
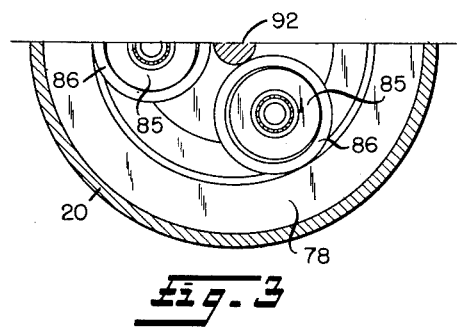
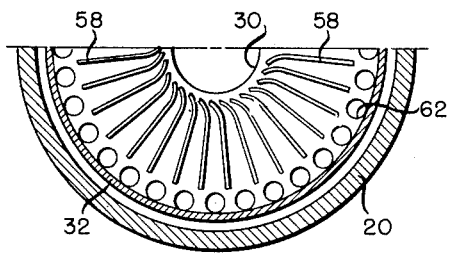
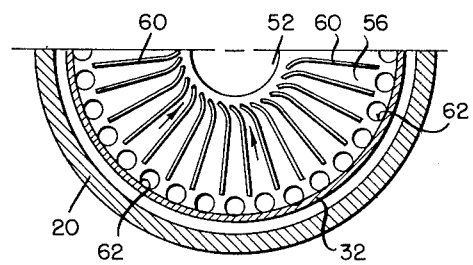
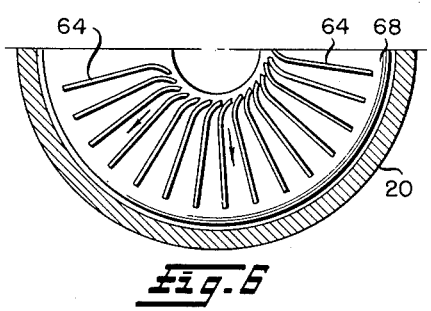
INVENTOR
Bo N. Hoffstrom
BY
ATTORNEYS

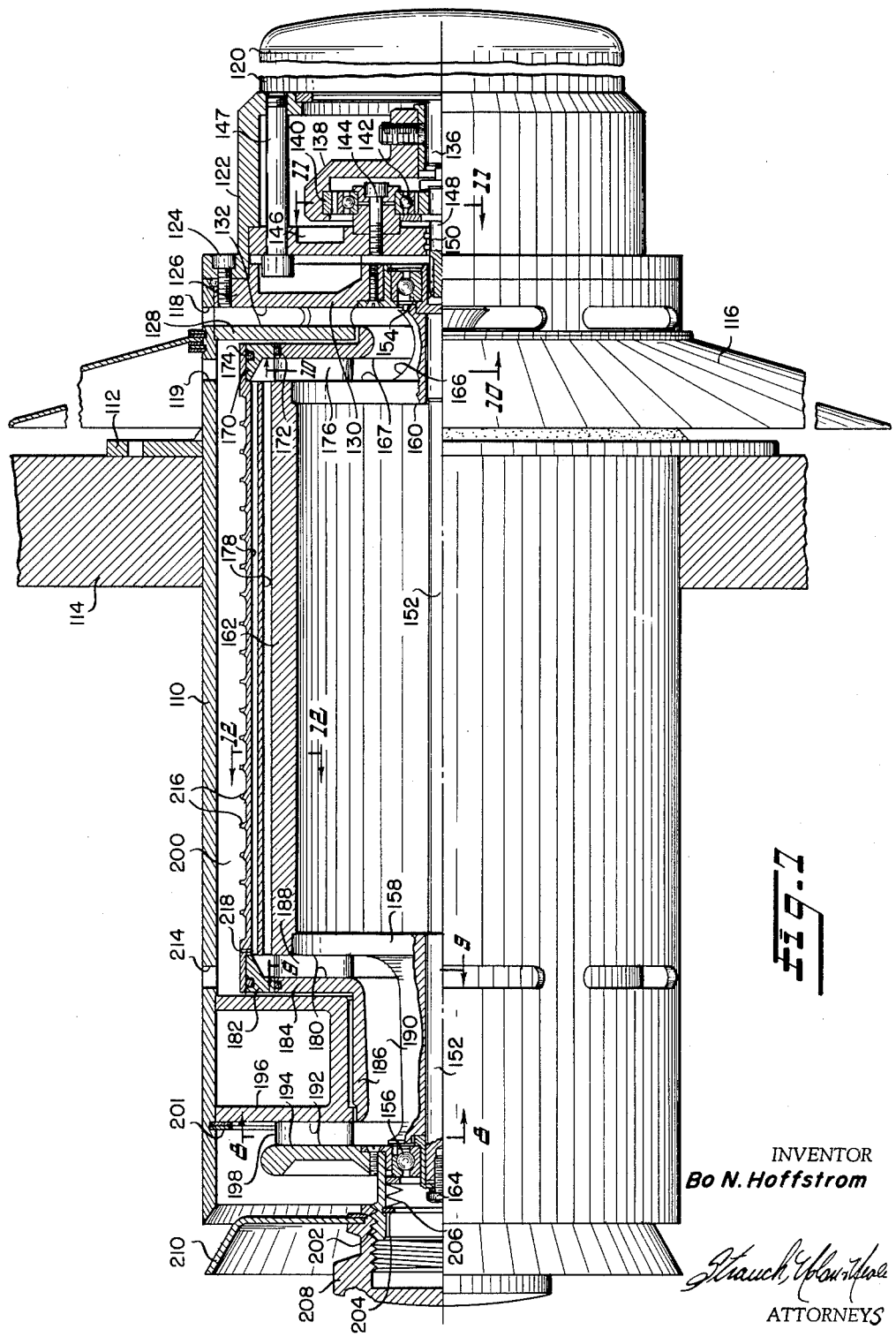

July 21, 1964   BO N. HOFFSTROM   3,141,310
HEAT PUMPS

Filed Oct. 16, 1962   4 Sheets-Sheet 4

INVENTOR
*Bo N. Hoffstrom*

BY  *Strauch Nolan & Neale*

ATTORNEYS

United States Patent Office 3,141,310
Patented July 21, 1964

3,141,310
HEAT PUMPS
Bo N. Hoffstrom, Los Angeles, Calif., assignor to Douglas Aircraft Company, Inc., Los Angeles, Calif., a corporation of Delaware
Filed Oct. 16, 1962, Ser. No. 230,976
9 Claims. (Cl. 62—402)

This invention relates to heat pumps and more particularly to heat pumps of novel construction in which ambient air is the operating fluid.

For present purposes the term "heat pump" is intended to refer to the general class of apparatus in which heat energy is transferred from one selected area to another area generally by connecting a heat absorbing device in one area to a heat emitting device in the other area. Examples are the apparatus used in household refrigerators, freezers and air conditioners, including air conditioners which may selectively be operated on a reverse cycle to heat a preselected space.

Most such devices presently in commercial use impart heat to or extract heat from the air indirectly by passing the air over the evaporator or condenser provided in a closed liquid filled circuit which also includes a compressor and a capilliary tube or expansion valve. While such units have enjoyed widespread acceptance, they have a number of significant disadvantages. For example, the relative complexity of such units contributes to their high initial cost and the high cost of repair when necessary. One of the principal problems encountered in the operation of such units as applied in refrigerators and freezers results from the use of a cold metallic surface for extracting heat from the surrounding air. The rapid build-up of frost on the cold surface requires the use of relatively complex controls for periodically interrupting or reversing the normal cycle of operation to remove or melt the frost which entails a serious loss of efficiency. Since most of the moisture deposited on the metallic surface is extracted from the food, the food is dehydrated and loses flavor and freshness. Also, as is well known in the art, mechanical problems of substantial magnitude are presented by the requirement for a sealed system containing the liquid refrigerant.

In recognition of these disadvantages, many attempts have been made to devise heat pump systems using working media other than liquid refrigerant or operating on entirely different principles. As far as is known, these efforts have been uniformly unsuccessful prior to the present invention except in very large units where a favorable Reynolds number allows high enough efficiency to be obtained.

In accordance with the present invention, novel heat pump apparatus is provided, which eliminates the requirement for all of the principal components of most conventional heat pumps such as a compressor, evaporator, condenser and the closed liquid filled circuit as well as separate blowers for moving air over the evaporator and condenser. All of these components have been replaced by a single moving member which performs the several functions of directly heating or cooling the air, cleaning and dehumidifying the air and moving it to the space to be heated or cooled. Essentially the present invention comprises a compact self-contained unit which is effective to compress ambient air thereby raising its temperature, to move the compressed air in heat exchange relation with secondary air at a lower temperature to thereby remove a substantial portion of heat energy of the compressed air and to thereafter permit expansion of the air to restore it to ambient pressure and deliver it to the space to be cooled. When the air is so expanded, its temperature is decreased to a value well below ambient. During this cooling cycle, the secondary air which is heated may be vented. When heating is desired, the heated secondary air is delivered to the space to be heated and the cooled primary air is vented. Thus the unit may be operated on either cycle by simply changing the air connections without modifying the action of the basic apparatus in any respect.

It is accordingly the primary purpose and object of the present invention to provide improved heat pumps operating on an air cycle.

It is a further object of the present invention to provide improved heat pumps which are of highly simplified, compact construction in which all of the necessary functions are performed by a single rotating member.

It is also an object of the present invention to provide improved heat pumps having an overall efficiency of operation not approached by prior units.

It is an additional object of the present invention to provide improved heat pumps which are substantially noiseless in operation.

It is a further object of the present invention to provide improved heat pumps which may be manufactured and sold at a cost well below the cost of units having comparable output and which have an extended maintenance-free service life.

It is also an object of the present invention to provide improved heat pumps which eliminate the need for periodic defrosting invariably encountered in prior units.

It is an additional object of the present invention to provide heat pumps which may be operated reversibly to heat or cool a space without the complex changeover system.

It is a further object of the present invention to provide novel air cycle heat pumps which operate automatically to filter and dehumidify the air passing through them.

Additional objects and advantages will become apparent as the description proceeds in connection with the accompanying drawings in which:

FIGURE 1 is a view of one embodiment of the heat pump constructed in accordance with the present invention shown partially in side elevation and partially in central section;

FIGURES 2, 3, 4, 5 and 6 are transverse half sections taken along lines 2—2, 3—3, 4—4, 5—5 and 6—6, respectively, of FIGURE 1 showing details of construction;

FIGURE 7 is a view similar to FIGURE 1 showing another and presently preferred embodiment of the present invention; and FIGURES 8, 9, 10, 11 and 12 are fragmentary transverse sections taken along lines 8—8, 9—9, 10—10, 11—11 and 12—12, respectively, of FIGURE 7 showing details of construction.

Referring now more particularly to the drawings, the heat pump illustrated in FIGURES 1–6 is generally of elongated, essentially cylindrical configuration and is contained in a cylindrical housing 20 to one end of which an electric drive motor 22 is secured as by bolts 24. The opposite end of the housing 20 is closed by an annular end plate 26 which supports a bearing assembly 28 upon which the axially elongated hollow hub member 30 of a rotor assembly indicated generally at 32 rotates.

Surrounding the outer periphery of the hub member 30 is a ring 34 which supports a cylindrical extension of the main rotor body member 36. A cylindrical extension projecting from the opposite end of the rotor body member 36 is similarly mounted on a ring 38 carried by the outer periphery of a hollow hub member 40 rotatably supported on a bearing assembly indicated generally at 42 carried by a stationary ring 44 suitably mounted on the housing member 20. O-rings 45, 46, 47 and 48 are provided to seal the joints between the hub members, the surrounding rings and the axially projecting portions of the rotor body 36. These O-rings also perform the function of locking the parts together by centrifugal force when the unit is in operation.

Cemented or otherwise secured to the inner periphery of the main rotor body member 36 are end plates 50 and 52, respectively, which form with the respective hub members 30 and 40 radial air channels 54 and 56. Positioned in the channel 54 are a set of pump vanes 58 which are preferably milled from the hub member 30 and cemented to the rotor members 36 and 50. A set of similar vanes 60 are positioned in the channel 56 and are preferably milled from the hub 40 and cemented to the rotor members 36 and 52. The outer ends of the channels 54 and 56 are connected by a plurality of holes 62 drilled through the rotor body member 36. The holes 62 are located as close together as possible and as close to the outer periphery of the rotor body 36 as mechanical strength requirements will permit.

Instead of holes, milled axial slots may be used. In this case the outer wall portion 32 of the rotor is a separate sleeve shrunk over the rotor after the slots have been milled.

The lefthand end of the hollow hub 40 is in communication with the inner end of a radial channel containing a set of diffuser vanes 64 which are milled from an annular wall member 66 and cemented to an opposite wall member 68, the inner periphery of the latter fitting in close clearance relation around the end of the hub member 40. The wall member 66 is clamped against the shoulder 70 in the housing 20 by the pilot portion 72 of the motor mount flange, an annular spacer ring 74, a thin spacer ring 76, a ring member 78 and a thin spacer member 80 to lock the diffuser vanes 64 against axial or rotary movement.

The motor 22 is drivingly connected to the rotor through a planetary step-up drive mechanism indicated generally at 82. This mechanism includes a spider 83, splined or press-fitted onto the motor drive shaft 84 which rotatably carries a plurality of ball bearing mounted rollers 85, each of which is surrounded by a deflectable planet ring 86. The rings 86 are compressed between the stationary outer ring 78 and the outer periphery of a short drive shaft 92, the opposite end of which is press-fitted into or splined to the inner periphery of the rotor wall member 52. The step-up drive mechanism is so dimensioned that in a typical case with an electric motor operating at 3600 r.p.m., the rotor assembly will be driven at a speed of approximately 45,000 r.p.m.

While, as stated above, the unit of the present invention is of general application and may be utilized wherever a supply of heated or cooled air is necessary, for illustrative purposes it will be assumed that the unit is connected to cool the interior of an enclosed space such as a domestic refrigerator. For this purpose a supply conduit 94 connects the space at the outer end of the diffuser vanes 64 to the interior of the refrigerator. The return line 96 leading from the interior of the refrigerator leads into an annular collector box 98 which is in communication through slots 100 with the annular chamber 102 formed between the inner wall of the housing 20 and the outer surface of the rotor assembly 32. The opposite end of the channel 102 is in communication with the atmosphere through a plurality of slots 104. In this particular application the main air inlet which is formed by the hollow hub 30 of the rotor assembly is also in direct communication with the ambient atmosphere.

When the unit is in operation, air is drawn in through the hub 30 by the pump vanes 58 which, in a typical case are effective to deliver the air at the inlet of the axially extending passages 62 at pressures approximately 50% above ambient. The vanes 58 are also effective to impart a rotary motion to the air so that at the exit end of the vanes 58 there is substantially no relative rotary motion between the air and the adjacent rotor parts. If it is assumed that the ambient temperature is 80° F., the temperature of the air as it enters the axial passages 62 will be approximately 146° F. As the air moves axially through the passages 62, it is in heat exchange relation with the air passing in the opposite direction through the annular space 102. After the unit has been in operation for a short period of time, the air returning from the interior of the refrigerator through the conduit 96 will be at a temperature of approximately 60° F. Thus the air passing from right to left in the primary air circuit through the channels 62 is in counterflow heat exchange relation with the secondary air passing from left to right through the annular space 102 thus substantially cooling the primary air and heating the secondary air. For example, the temperature of the primary air as it enters the outer ends of the vanes 60 will be approximately 106° F. and the air in the secondary circuit issuing through the slots 104 will have a temperature of approximately 100° F. It will be noted that the air entering the channel 102 flows in a purely axial direction while the wall 32 moves at high circumferential speed. This substantially raises the coefficient of heat transfer in this area. As the secondary air progresses along the space 102, it begins to spin and eventually achieves a rotary velocity approximately half that of the rotor assembly. While this does lower the coefficient of heat transfer to some extent, it also reduces heat generation due to boundary layer friction.

As the air passes inwardly over the vanes 60, pressure is reduced to substantially ambient and its temperature is accordingly lowered. In the example given, the temperature of the air at the inner end of the vanes 60 will be approximately 40° F. The vanes 60 are so constructed as to retain some of the kinetic energy so that the air, as it passes through the hub 40, has a slight spin. Accordingly, any condensate which is produced as the temperature of the air is lowered is thrown against the inner wall of the hub 40 which is tapered slightly to produce a flow of the condensate from left to right as viewed in FIGURE 1. From the right end of the hub the condensate flows outwardly through the passage 56 and ultimately through one or more bleed openings 106 in the outer wall of the rotor assembly. It then passes into the stream of secondary air flowing through the space 102, is vaporized and is carried away with the airstream exiting through the slots 104. This helps remove heat from the primary air in holes 62.

After passing through the hub 40, the air moves through the diffuser vanes 64 and passes outwardly through the conduit 94 to the interior of the refrigerator or other space to be cooled. The purpose of the diffuser vanes is to convert the kinetic energy due to the spin of the air in the hollow hub 40, which was required for separation of moisture, to pressure, and thus prevent it from being lost (converted to heat contrary to the purpose of the machine).

The relative humidity of the cooled air delivered to the conduit 94 is close to 100%. Accordingly, the interior of the refrigerator is maintained at conditions of temperature and humidity which are ideal for the storage of food. The related problems of excessive dehydration of foods and frost formation invariably associated with conventional refrigerators are eliminated.

Where the unit is used to heat or cool a room or other space of substantial size, it may be desirable to induce a positive flow of secondary air through the channel 102, for example, by the installation of vanes carried by the outer surface of the rotor assembly adjacent the outlet end of the channel 102.

When the unit is used to cool a room, air may be delivered directly from the conduit 94 into the room. As the air enters the room, its temperature is substantially increased with a corresponding decrease in relative humidity to the optimum level.

The unit of the present invention may be readily adapted for heating a space by conducting the air issuing from the slots 104 to the space. The duct 96 becomes the outside air inlet and duct 94 returns the cooled air to the outside ambient air in any suitable manner. Also, with appropriate conduits the unit can be used simultaneously for heating and cooling.

It is also to be noted that dust and other impurities are removed from the air as it passes through the passages 62. Particles of extremely small size, i.e. those contained in cigarette smoke, are deposited on the outer portions of the passages 62 because of the action of the strong centrifugal force to which they are subjected.

After a period of operation the end plate 26 is removed permitting withdrawal of the rotor assembly. The apparatus may then be cleaned by blowing air through the passages 62 in which the dust and dirt have accumulated.

The embodiment of FIGURES 7–12, to which detailed reference will now be made, is of essentially the same construction as the previously described embodiment. The unit is enclosed in a stationary cylindrical shell 110 which at one end is provided with a mounting flange 112 for attachment to any fixed structure, for example a wall 114. Also secured to the outer surface of the shell 110 is a conical deflector 116 which prevents re-circulation between the slots 118 which form a part of the primary air circuit and the slots 119 which form a part of the secondary air circuit.

The drive motor 120 is secured by any suitable means to an adaptor 122 bolted as at 124 to an end plate assembly 126 welded to the end of the shell 110. The end plate assembly 126 is provided with parallel walls 128 and 130 forming a radial passage 132 aligned with the air inlet slots 118 through which the ambient air enters the eye of the compressor blades 176.

The motor shaft 136 is non-rotatably secured to a ring 138, the inner periphery of which engages a plurality of planet members 140 rotatably mounted by bearings 142 on shaft assemblies 144 carried by an intermediate plate 146 secured by bolts 147 to the adaptor 122. The drive is transmitted from the ring gear through the planets 140 to an intermediate rotor shaft 148 which passes through a sealed central opening 150 in the plate 146 and is splined to the adjacent end of the main rotor shaft 152.

The main rotor shaft is supported at its opposite ends in bearings 154 and 156 coaxially of the shell 110, the bearings 154 being carried by the end plate assembly 126. Non-rotatably mounted on the rotor shaft 152 are a pair of end rotor assemblies 158 and 160, the outer peripheries of which clampingly engage the main tubular rotor body 162. The rotor assembly thus far described is held on rotor shaft 152 by a bolt 164 threaded into the end of the rotor shaft remote from the drive motor 120.

The outer surface of the hub of the end plate assembly 160 is smoothly curved as at 166 to reverse the direction of the incoming air passing through the passage 132 and to cause said air to pass radially outward through a passage 167 between the radial wall of the end plate assembly 160 and a plate 167 fitted within an adaptor ring 170 in turn received in a cylindrical counterbore in the end of the tubular rotor body 162. O-rings 172 and 174 are provided to hold the parts in place as well as to prevent the leakage of air.

Figure 10:
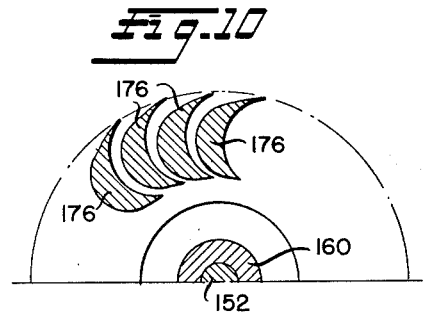
Figure 11:
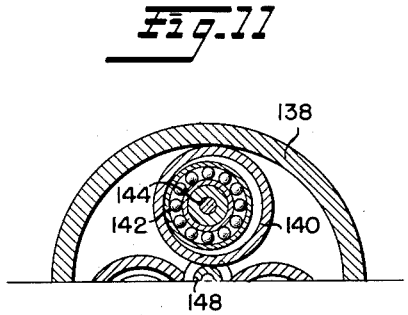
Figure 12:
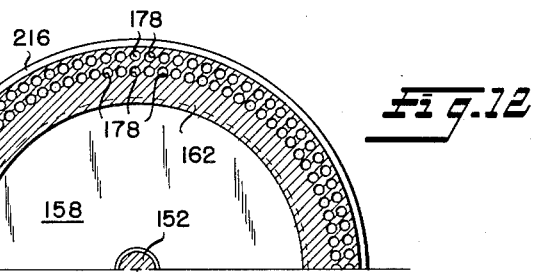

Impeller vanes 176 shown in FIGURE 10 are formed integrally with or cemented to the plate 167 and extend across the space between the plate and the end of the rotor body 162. The air delivered by the impeller vanes 176 passes through a plurality of through bores 178 formed in the tubular rotor member 162 and is delivered to a radial passage 180 at the opposite end of the rotor formed by an adaptor member 182 similar to the member 170 and an end member having a radial wall 184 and a generally cylindrical wall 186. Formed integrally or cemented to the radial wall 184 are a plurality of turbine blades 188 shown in FIGURE 9.

The inner periphery of the axially extending wall 186 and the outer periphery of the rotor end member 158 cooperate to form a generally axially extending passage 190 connecting the inner end of the radial passage 180 and a radial outlet passage 192 formed between the wall members 194 and 196 which are connected by diffusor vanes 198 shown in FIGURE 8. Member 196 is annular and of U-shaped cross-section and also forms the end of the secondary air passage 200 between the shell 110 and the outer periphery of the tubular rotor body 162. The assembly comprising members 194, 196 and 198 is held in place by a snap ring 201. An axial extension 202 of the member 194 carries an internal snap ring 204 which positions a series of Belleville springs 206 to maintain a predetermined axial load on the bearing assembly 156 and through the rotor on the opposed bearing assembly 154. The axial extension 202 also forms a threaded support for a manually adjustable throttle assembly 208 which carries a throttle ring 210 adapted to regulate the effective size of the opening 212 at the open end of the shell 110.

In a typical case the unit of FIGURE 7 may be mounted in the wall 114 of a building to dispose the primary air inlet slots 118 and the secondary air outlet slots 119 outside the building and to dispose the primary air outlet 212 and the secondary air inlet slots 214 inside the building. When so installed, the unit will effectively cool the interior of the building.

In operation, rotation of the rotor causes air to be drawn in through the primary inlet slots 118 and after further compression by the blades 176 the air is delivered to the annular passages 178. During the travel of the air through these passages, its temperature is reduced since it moves in counterflow relation with air entering through the slots 214 and passing to the outlet slots 119. To facilitate heat exchange between the two streams of air, the outer periphery of the rotor body 162 is provided with a plurality of fins 216 which promote turbulence and ventilate the boundary layer at the outer periphery of the rotor. The fins 216 may be formed integrally on the outer periphery of the rotor body or alternatively the rotor body may be made up of a plurality of rings each containing one of the fins, the rings being cemented together. The cement has a certain insulating value which inhibits the flow of heat axially of the rotor assembly which further increases the efficiency of the unit.

The relatively cooled air then passes inwardly through the radial passage 180, through the axial passage 190 and thence through the radial passage 192 for delivery to the room. As in the previously described embodiment the action of vanes 188 and 198 is such as to further substantially reduce the temperature of the air. Also as in the previously described embodiment, the air passes through passage 190 with a slight spin and the outer wall of the passage 190 is tapered slightly so that the condensate deposited on this wall flows outwardly through the passage 180 for disposition through one or more bleed openings 218 leading into the secondary air passage 200.

The output of the mechanism can be easily regulated by adjustment of the position of the throttle member 210. Usually the slightly superatmospheric pressure established in the room by the air flowing out through the opening 212 will be sufficient to insure an adequate flow of secondary air through the passage 200. If a sufficient flow of air is not produced by this means, impeller blading can be included as a part of the rotor assembly.

The apparatus of FIGURE 7 is preferred over the apparatus of FIGURE 1 when installed for cooling since the drive motor 120 is disposed at the hot end of the unit and thus imposes no heat load on the space to be cooled. It is also to be preferred because of the controllability of its operation. In this connection it will be apparent that while a manual throttle setting has been disclosed, the position of the throttle 210 can also be made to be responsive to temperature changes within the space served by the unit.

This application is a continuation-in-part of application

Serial No. 107,444 filed May 3, 1961, for Heat Pumps.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An air cycle heat pump comprising an elongated stationary casing having a primary air inlet at one end and a primary air outlet at the other end, a rotor supported for rotation within said housing, said rotor having an air inlet passage communicating with said primary air inlet and having at least a portion thereof adjacent the axis of said rotor, said rotor having an air outlet passage communicating with said primary air outlet, at least a portion of said air outlet passage being disposed adjacent the axis of said rotor, means defining a plurality of axially extending passages in said rotor disposed radially outward of said portions of said air inlet and outlet passages and connected at the opposite ends to the respective air inlet and air outlet passages, means for rotating said rotor, first generally radially extending blade means in said rotor operable upon said rotation of said rotor for moving said air through said primary inlet and said air inlet passage, said air moving from said portion of said air inlet passage radially outward to said axially extending passages, said air in its radial movement being compressed and heated, passage means formed within said housing and extending around said rotor for circulation of a cooling medium in heat exchange relation with the air passing through said axially extending rotor passages to reduce the temperature of said air, second generally radially extending blade means interposed between said axially extending passages in the path of said air for extracting heat energy from said air before it reaches said primary outlet, the temperature of said air decreasing substantially as it passes through said second blade means.

2. An air cycle heat pump comprising a rotor having an air inlet passage adjacent one end and an air outlet passage adjacent its opposite end, at least a portion of said passages being adjacent the axis of said rotor and a plurality of axially extending passages disposed radially outward of said portion of said air inlet and air outlet passages, means in said rotor forming radial passages connecting said portion of said air inlet passage and one end of said axial passages, means in said rotor forming radial passages connecting the opposite end of said axially extending passages with said portion of said air outlet passage, a plurality of blades in each of said radial passages for forcing air successively through said air inlet passage, said axial passages and toward said air outlet passage whereby said air is compressed as it is delivered to said axially extending passages and its temperature is raised, a stationary casing surrounding said rotor and forming with said rotor an annular channel in surrounding relation with the portion of said rotor containing said axially extending passages, means for circulating a cooling medium through said channel in heat exchange relation with the air as it passes through said axially extending passages, said air being decompressed as it passes from said axially extending passages to said air outlet passage, the temperature of said air decreasing substantially as it is decompressed.

3. The heat pump according to claim 2 together with means for delivering condensate produced when said air is being decompressed to said stream of cooling medium.

4. An air cycle heat pump comprising a rotor assembly having an axial air inlet adjacent one end and an axial air outlet adjacent the opposite end and a plurality of axially extending passages disposed radially outwardly of said air inlet passage and said air outlet passage, a set of first radial blades disposed in a first radial passage for moving air from said inlet to one end of said axially extending passages whereby said air is compressed and its temperature is raised, means forming an annular channel in surrounding relation with the portion of said rotor containing said axially extending passages through which a cooling medium is passed in heat exchange relation with the air as it passes through said passages, a second set of radial blades disposed in a second radial passage connecting the opposite end of said axially extending passages and said air outlet to decompress the air passing therethrough and deliver it into said outlet in a revolving flow pattern, the temperature in said air decreasing substantially as it is decompressed, the condensate produced when said air is decompressed being deposited on the wall of said air outlet passage, and the wall of said outlet passage being tapered to cause said condensate to flow outwardly through said second set of blades and through an opening in the wall of said rotor into said stream of cooling medium.

5. An air cycle heat pump comprising a rotor assembly having an air inlet passage adjacent one end and an air outlet passage adjacent the opposite end, a portion of each of said passages being disposed adjacent the axis of said rotor and a plurality of axially extending passages disposed radially outward of said portions of said air inlet and air outlet passages, a first set of radial blades disposed in a first radial passage for movement of air from said air inlet passage to one end of said axially extending passages whereby said air is compressed and its temperature is raised, means forming an annular channel in surrounding relation with the portion of said rotor containing said axially extending passages through which a cooling medium is passed in heat exchange relation with the air as it passes through said axially extending passage, a second set of radial blades disposed in a second radial passage connecting the opposite end of the axially extending passages and said air outlet passage to decompress the air passing therethrough and deliver it to said air outlet passage in a revolving flow pattern, the temperature in said air decreasing substantially as it is decompressed, the condensate produced when the said air is decompressed being deposited on the wall of said portion of said air outlet passage and the wall of said portion of said air outlet passage being tapered to cause the condensate to flow outwardly through said second set of blades and through an opening in the wall of said rotor into said stream of cooling medium.

6. An air cycle heat pump comprising an elongated stationary casing having a primary air inlet at one end and a primary air outlet at the other end, a rotor supported for rotation within said housing, said rotor having an air inlet passage communicating with said primary air inlet and having at least a portion thereof adjacent the axis of said rotor, said rotor having an air outlet passage communicating with said primary air outlet, at least a portion of said air outlet passage being disposed adjacent the axis of said rotor, means defining a plurality of axially extending passages in said rotor disposed radially outward of said portions of said air inlet and outlet passages and connected at the opposite ends to the respective air inlet and air outlet passages, means for rotating said rotor, first generally radially extending blade means in said rotor operable upon said rotation of said rotor for moving said air through said primary inlet and said air inlet passage, said air moving from said portion of said air inlet passage radially outward to said axially extending passages, said air in its radial movement being compressed and heated, passage means formed within said housing and extending around said rotor for circulation of a cooling medium in heat exchange relation with the air passing through said axially extending rotor passages to reduce the temperature of said air, second generally radially extending blade means interposed between said axially extending passages in the path of said air for extracting heat energy from said air before it reaches said primary outlet, the temperature of said air decreasing substantially as it passes through said second blade means, and means for controlling the flow of air through said primary air outlet.

7. An air cycle heat pump comprising an elongated stationary casing having a primary air inlet and a cooling medium outlet at one end and a primary air outlet and a cooling medium inlet adjacent the other end, a rotor supported for rotation within said housing, a drive motor secured to said one end of said casing and drivingly connected to said rotor, said rotor having an air inlet passage communicating with said primary air inlet and having at least a portion thereof adjacent the axis of said rotor, said rotor having an air outlet passage communicating with said primary air outlet, at least a portion of said air outlet passage being disposed adjacent the axis of said rotor, means defining a plurality of axially extending passages in said rotor disposed radially outward of said portions of said air inlet and outlet passages and connected at the opposite ends to the respective air inlet and air outlet passages, first generally radially extending blade means in said rotor operable upon rotation of said rotor for moving air through said primary air inlet and said air inlet passage, said air moving from said portion of said air inlet passage radially outward to said axially extending passages, said air in its radial movement being compressed and heated, passage means formed within said casing and connecting said cooling medium inlet and said cooling medium outlet and extending around said rotor for circulation of the cooling medium in heat exchange relation with the air passing through said axially extending rotor passages to reduce the temperature of said air, and second generally radially extending blade means interposed between said axially extending passages and said primary air outlet for extracting heat energy from said air before it reaches said primary air outlet, the temperature of said air decreasing substantially as it passes through said second blade means.

8. The heat pump according to claim 7 wherein the outer periphery of said primary air outlet is formed by the open end of said casing together with means for adjustably controlling the effective size of said primary air outlet.

9. The heat pump according to claim 7 wherein said axially extending passages are positioned closely adjacent the outer periphery of said rotor and a plurality of circumferentially extending fins are provided on the outer periphery of said rotor to increase the rate of heat exchange between said air and said cooling medium.

References Cited in the file of this patent
UNITED STATES PATENTS

| | | |
|---|---|---|
| 2,511,691 | Bramley | June 13, 1950 |
| 2,526,618 | Derrievs | Oct. 24, 1950 |
| 2,778,204 | Frank | Jan. 22, 1957 |